United States Patent Office 3,540,306
Patented Nov. 17, 1970

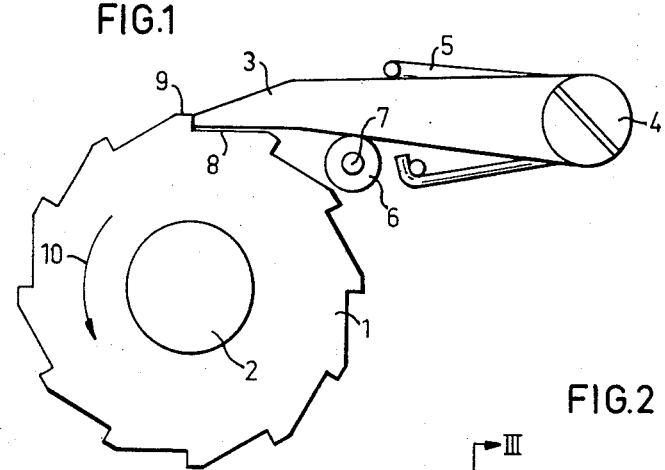
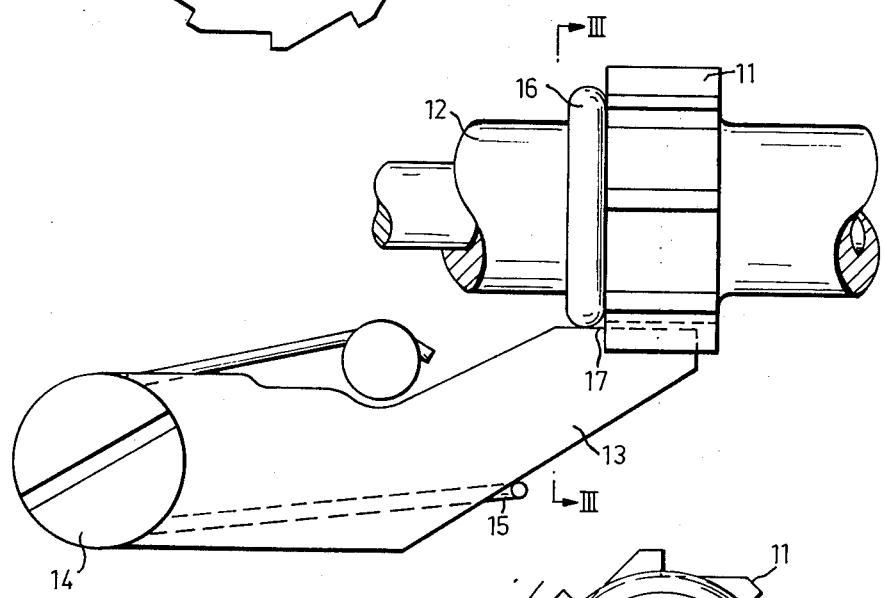
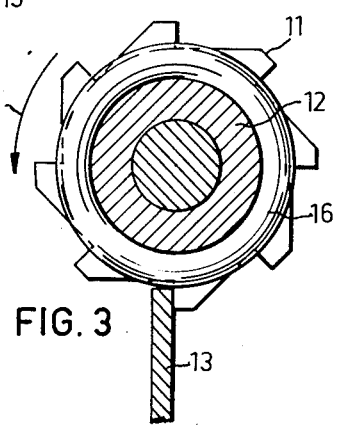

3,540,306
MEANS FOR REDUCING THE SOUND OF A RACHET AND PAWL MECHANISM
Karl Nurmse, Svangsta, Sweden, assignor to Abu Aktiebolag, Svangsta, Sweden, a corporation of Sweden
Filed Oct. 14, 1968, Ser. No. 767,433
Claims priority, application Sweden, Oct. 17, 1967, 14,205/67
Int. Cl. F16d *41/12*
U.S. Cl. 74—576          1 Claim

ABSTRACT OF THE DISCLOSURE

A device for reducing the sound produced in a ratchet and pawl mechanism by the repeated impact of the pawl against the ratchet teeth, especially in fishing reels, which device consists of a resilient and damping abutment for the pawl stopping its inward motion shortly before it hits the bottom of the space or recess between two consequent ratchet teeth.

---

This invention relates to a device for reducing the sound of a ratchet and pawl mechanism, especially in fishing reels, comprising a spring actioned pawl cooperating with a ratchet wheel.

During rotation of the ratchet wheel the pawl rides over the ratchet teeth and produces a sound which can become very disturbing in a fishing reel. Means to reduce this sound have been suggested, mostly consisting of a friction coupling which swings the pawl away from the ratchet wheel when this is rotated opposite to the locking direction.

It is a purpose of the invention to provide simplier and cheaper means which can be mounted in existing fishing reels with no or only slight changes therein. According to the invention an elastic and damping abutment for the pawl is provided for stopping the pawl before it hits the bottom of the recess formed between consecutive teeth of the ratchet wheel.

Two embodiments of the invention are described with reference to the accompanying drawing.

FIG. 1 is a view in the axial direction of the ratchet wheel of a ratchet and pawl mechanism in which the pawl is movable in the plane of the ratchet wheel.

FIG. 2 shows diagrammatically in side elevation a ratchet and pawl mechanism in which the ratchet is movable in a plane passing through the axis of the ratchet wheel.

FIG. 3 shows a section taken along line III—III of FIG. 2.

In the embodiment of FIG. 1 the ratchet wheel is designated by 1, the ratchet wheel shaft by 2, the pawl shaft by 4 and the spring biasing the pawl towards the ratchet wheel by 5. According to the invention an elastic, dampening abutment in the shape of a sleeve 6 of rubber or other elastic material is mounted on a pin 7 fixedly mounted into the housing of the mechanism. The abutment 6 is mounted in such a position relative to pawl 3 that the latter is stopped with its operative end at a little distance from the bottom 8 of the space between consecutive ratchet teeth when the pawl has left the foregoing tooth 9 during the rotation of the ratchet wheel in the direction marked by arrow 10.

In the embodiment illustrated in FIGS. 2 and 3 the ratchet wheel is designed by 11, its shaft by 12, the pawl by 13, the shaft of the pawl by 14 and the spring actioning the pawl towards the ratchet wheel by 15. A ring 16 of rubber or similar elastic material, a so-called "O-ring," is mounted with an initial tension onto the shaft 12 of the ratchet wheel 11 adjacent to one side thereof. The ring may, if necessary, be maintained in position by a shallow groove in the shaft 12. The thickness of the ring 16 is such that its outer periphery has a slightly larger radial spacing from the axis of the ratchet wheel than the bottoms of the spaces between the ratchet teeth. The end edge 17 of the pawl cooperating with the ratchet teeth extends a little distance outside the abovementioned side of the ratchet wheel so that it can rest against the periphery of the ring 16 between two ratchet teeth.

The device operates in the same manner in both embodiments described above.

During rotation of the ratchet wheel 1 or 11 in the direction of the arrow 10 (FIGS. 1 and 3) the pawl 3 or 13, after having passed over the top of a ratchet tooth, is accelerated radially towards the bottom of the adjacent space between two ratchet teeth. In ordinary ratchet and pawl mechanisms without dampening abutment 6 or 16 the point of the pawl hits the back of the following ratchet tooth which simultaneously moves radially outwards, which produces a hard impact and the well known rasping sound. The abutment 6 or 16 according to the invention stops the inwards movement of the pawl 3 or 13 before it hits the bottom of the recess between the teeth. The progressive approach of the back of the next tooth towards the pawl does not produce any appreciable sound. In practical use the reduction of sound obtained by the device according to the invention has shown to be so important that the sound produced can only be heard by placing the ear very near the reel. The device has the further advantage to considerably reduce the wear of the ratchet wheel and the pawl.

Though the invention has been illustrated in two distinct embodiments, the protection claimed is not limited to these. Thus a ratchet and pawl mechanism of the type illustrated in FIGS. 2 and 3 might very well within the scope of the claims be provided with an abutment 6, 7 of the type illustrated in FIG. 1 instead of with a ring as shown in FIGS. 2 and 3.

What I claim is:
1. A device for reducing the sound of a ratchet and pawl mechanism, especially in a fishing reel, comprising, a shaft, a ratchet wheel on said shaft having spaced teeth defining an adjacent space between said teeth; a spring-biased pawl cooperating with the ratchet wheel, said pawl being constructed and arranged to provide an edge cooperating with said ratchet wheel and extending outside one side of the ratchet wheel, an elastic damping abutment to arrest the movement of said pawl before it strikes the bottom of the adjacent space between said ratchet teeth, said abutment comprising a ring surrounding the shaft of said ratchet wheel adjacent said ratchet wheel, the outer periphery of said ring being at a greater radial distance from the axis of the ratchet wheel than the spaces between said ratchet teeth.

References Cited
UNITED STATES PATENTS 2,389,695  11/1945  Stenhammer _____ 74—576
3,075,721  1/1963   Sarah _____ 74—576 XR FRED C. MATTERN, Jr., *Primary Examiner*

F. D. SHOEMAKER, *Assistant Examiner*

U.S. Cl. X.R.
242—84.1